(12) United States Patent  (10) Patent No.: US 8,532,144 B2
Björklund et al.  (45) Date of Patent: Sep. 10, 2013

(54) POINT-TO-POINT COMMUNICATION IN A HIGH VOLTAGE POWER TRANSMISSION SYSTEM

(75) Inventors: Hans Björklund, Ludvika (SE); Krister Nyberg, Smedjebacken (SE)

(73) Assignee: ABB Technology AG, Zürich (CH)

( * ) Notice: Subject to any disclaimer, the term of this patent is extended or adjusted under 35 U.S.C. 154(b) by 470 days.

(21) Appl. No.: 12/600,319

(22) PCT Filed: May 12, 2008

(86) PCT No.: PCT/EP2008/055789
§ 371 (c)(1),
(2), (4) Date: Nov. 16, 2009

(87) PCT Pub. No.: WO2008/138910
PCT Pub. Date: Nov. 20, 2008

(65) Prior Publication Data
US 2010/0150175 A1 Jun. 17, 2010

Related U.S. Application Data

(60) Provisional application No. 60/924,415, filed on May 14, 2007.

(51) Int. Cl.
*H04J 3/24* (2006.01)
(52) U.S. Cl.
USPC .......... 370/475; 370/389; 370/476; 370/474; 370/471; 370/278; 370/503
(58) Field of Classification Search
None
See application file for complete search history.

(56) References Cited

U.S. PATENT DOCUMENTS

| 4,974,150 | A | 11/1990 | Long |
| 6,931,027 | B1 * | 8/2005 | Vogel et al. .................. 370/477 |
| 7,751,442 | B2 | 7/2010 | Chang et al. |
| 2003/0120716 | A1 | 6/2003 | McClellan et al. |

(Continued)

FOREIGN PATENT DOCUMENTS

| CN | 1894906 A | 6/2006 |
| CN | 1797901 A | 7/2006 |

(Continued)

OTHER PUBLICATIONS

Bengt Jansson et al; "Kontek HVDC Interconnection"; IEE, 1996; pp. 118-123.

(Continued)

*Primary Examiner* — Kibrom T Hailu
(74) *Attorney, Agent, or Firm* — Venable LLP; Eric J. Franklin

(57) ABSTRACT

A method for sending signals from an active computer in a high-voltage power transmission system including active protection computers and active and standby control computers in a hierarchical structure having at least two hierarchical levels. A high-voltage power transmission system and a control station for at least a part of such a transmission system. In the system all computers on the various hierarchical levels are connected to at least two separate computer communication networks. An active computer sends signals that are to be received by at least one other computer at the same or another hierarchical level simultaneously on the two separate computer communication networks to which it is connected.

21 Claims, 3 Drawing Sheets

(56) References Cited

U.S. PATENT DOCUMENTS

| | | |
|---|---|---|
| 2004/0103333 A1* | 5/2004 | Martwick et al. ............. 713/400 |
| 2005/0047391 A1 | 3/2005 | Tuxen |
| 2005/0135421 A1 | 6/2005 | Chang et al. |
| 2006/0109376 A1 | 5/2006 | Chaffee et al. |
| 2008/0204054 A1* | 8/2008 | Wells ............................ 324/713 |

FOREIGN PATENT DOCUMENTS

| | | |
|---|---|---|
| EP | 1659465 A2 | 5/2006 |
| EP | 1708445 A1 | 10/2006 |
| GB | 2426165 A | 11/2006 |
| WO | WO-2006/128400 A1 | 12/2006 |
| WO | WO-2008/036303 A2 | 3/2008 |

OTHER PUBLICATIONS

B. Nicol et al.; "Win-TDC The State-of-the-Art Control and Protection System for HVDC Applications"; IEEE; 2005; pp. 1-5.

Leandro Bertoni et al.; "MACH2—Modular Advanced Control 2nd Edition"; IEEE; 2004; pp. 1-6.

Jim Y. Cai et al.; "Current Status and Experience of WAMS Implementation in North America"; IEEE; 2005; pp. 1-7.

J. D. Ainsworth; "Telecommunication for h.v.d.c. control"; GEC Journal of Science & Technology, vol. 48, No. 3, 1982; pp. 159-162.

Yue Yuan et al.; "A Real-time Monitoring Method for Power System Steady State Angle Stability based on WAMA"; IEEE; 2005; pp. 1-4.

IEEE Standard for Synchrophasors for Power Systems; Mar. 22, 2006; 4 pages.

M. Davies; "Latest Control and Protection Innovations Applied to the Basslink HVDC Interconnector"; IEE; 2006; pp. 30-35.

Frik Venter et al.; "A Distributed Sequential Control for the Apollo HVDC Substation"; IEEE; 2006; pp. 879-873.

International Search Report—Oct. 27, 2008.

Written Opinion of the International Searching Authority—Oct. 27, 2008.

International Preliminary Report on Patentability—Jun. 2, 2009.

Chinese Notification of the First Office Action and Translation—July 2, 2012 (Issued in Application/Patent No. 200880000710.7).

* cited by examiner

US 8,532,144 B2

POINT-TO-POINT COMMUNICATION IN A HIGH VOLTAGE POWER TRANSMISSION SYSTEM

FIELD OF INVENTION

The present invention relates to a method and first device for transmitting data related to the control of a high voltage power transmission system as well as to a method and a second device for receiving data related to the control of a high voltage power transmission system.

BACKGROUND

In high voltage power transmission systems there is a lot of various types of communication provided between devices such as control and/or protection computers and control and measurement nodes. A control and measurement node here typically may interface various units such as breakers, disconnectors, grounding switches and load tap changers in transformers. They also typically perform measurements.

The data sent in such communication might here include measurement samples taken in the process being controlled, which are here normally current and voltage samples in various sections of the system, field bus type of data such as commands, alarms and indications, time synchronization signals for synchronizing the operation of elements with which such control and measurement nodes interface as well as sampling synchronization signals for synchronizing the time samples which are to be taken by a control and measurement node.

Traditionally the communication for these various types of data have been provided using different types of connections. Field bus type of data is here normally sent on a field bus connected between a computer and a number of control and measurement nodes, measurement samples are often sent on a TDM (Time Division Multiplex) bus or direct point-to-point connections, time synchronization data is often sent on dedicated point-to-point connections, while sample synchronization signals are often sent on dedicated point-to-point connections.

This means that there are a great number of various types of connections between devices such as a computer and a control and measurement node.

It would therefore be of interest if these connections could be reduced.

EP 1 191 732 describes a material processing data communication system and method for communicating data between internal assemblies of the system. Here clock data is encoded in data sent on a fiber optic link provided between two interconnected data ports of two internal assemblies. The clock data is encoded onto the data using 8B/10B (8 bit/10 bit) coding and is used for reconstructing this data. Also CRC (Cyclic Redundancy Code) coding is described.

US 2005/0089334 describes an optical system where management messages are superposed onto data transmitted at high frequency via an optical fiber.

US 2005/0135421 describes Ethernet data frames in a device-to-device interconnection, where 8B/10B coding has been used. Through the 8B/10B coding control messages are interleaved with content data.

However, none of these documents concerns a high voltage power transmission system.

In view of what has been described above there is therefore a need for reducing the number of connections between a first and a second device in a high voltage power transmission system.

SUMMARY OF THE INVENTION

One object of the present invention is to provide a method for transmitting data related to the control of a high voltage power transmission system, which method reduces the number of connections between a first and second device in the system.

This object is according to a first aspect of the present invention solved through a method for transmitting data related to the control of a high voltage power transmission system, and comprising the steps of:
providing a first frame of data including data symbols according to a frame structure where it is possible to provide sections for data symbols containing measurement samples and sections for data symbols containing field bus type of data,
inserting synchronization data into the first frame in the form of control symbols distinctively separated from the data symbols, and
sending the first frame from a first device to a second device in a point-to-point connection,
where the synchronization data concerns synchronization of control activities performed by the second device.

Another object of the present invention is to provide a first device for transmitting data related to the control of a high voltage power transmission system, which reduces the number of connections between the first device and a second device in the system.

This object is according to a second aspect of the present invention solved through a first device for transmitting data related to the control of a high voltage power transmission system, and comprising
means for providing a first frame of data including data symbols according to a frame structure where it is possible to provide sections for data symbols containing measurement samples and sections for data symbols containing field bus type of data,
means for inserting synchronization data into the first frame in the form of control symbols distinctively separated from the data symbols, and
means for sending the first frame from the first device to a second device in a point-to-point connection,
where the synchronization data concerns synchronization of control activities performed by the second device.

Another object of the present invention is to provide a method for receiving data related to the control of a high voltage power transmission system, which reduces the number of connections between a first and second device in the system.

This object is according to a third aspect of the present invention solved through a method for receiving data related to the control of a high voltage power transmission system, and comprising the steps of:
receiving, in a point-to-point connection by a second device from a first device, a first frame of data including data symbols according to a frame structure where it is possible to provide sections for data symbols containing measurement samples and sections for data symbols containing field bus type of data and into which first frame synchronization data, in the form of control symbols distinctively separated from the data symbols, has been inserted,
extracting the synchronization data from the first frame, and
processing, after the extracting, the first frame for obtaining the data symbols, where the synchronization data concerns synchronization of control activities performed by the second device.

Another object of the present invention is to provide a second device for receiving data related to the control of a high voltage power transmission system, which reduces the number of connections between the second and a first device in the system.

This object is according to a fourth aspect of the present invention solved through a second device for receiving data related to the control of a high voltage power transmission system, and comprising:
- means for receiving, in a point-to-point connection from a first device, a first frame of data including data symbols according to a frame structure where it is possible to provide sections for data symbols containing measurement samples and sections for data symbols containing field bus type of data and into which first frame synchronization data, in the form of control symbols distinctively separated from the data symbols, has been inserted,
- means for extracting the synchronization data from said first frame, and
- means for processing, after the extracting, the first frame for obtaining the data symbols, where the synchronization data concerns synchronization of control activities performed by the second device.

The present invention has a number of advantages. It provides a single point-to-point connection between a first and a second device in a high voltage power transmission system, which may be fast. With a fast connection it is furthermore possible to transmit a lot of measurement samples over the connection together with field bus type of data. There is therefore a reduction of the number of connections being provided between the two devices. The invention also provides a very fast, reliable and flexible synchronization of the second device.

BRIEF DESCRIPTION OF THE DRAWINGS

The present invention will in the following be described with reference being made to the accompanying drawings, where FIG. 1 schematically shows a power transmission system in which the present invention may be used, FIG. 2 schematically shows a block schematic of a control computer according to the present invention.

DETAILED DESCRIPTION OF THE INVENTION

In the following, a detailed description of preferred embodiments of a device and a method according to the present invention will be given.

Figure 1:
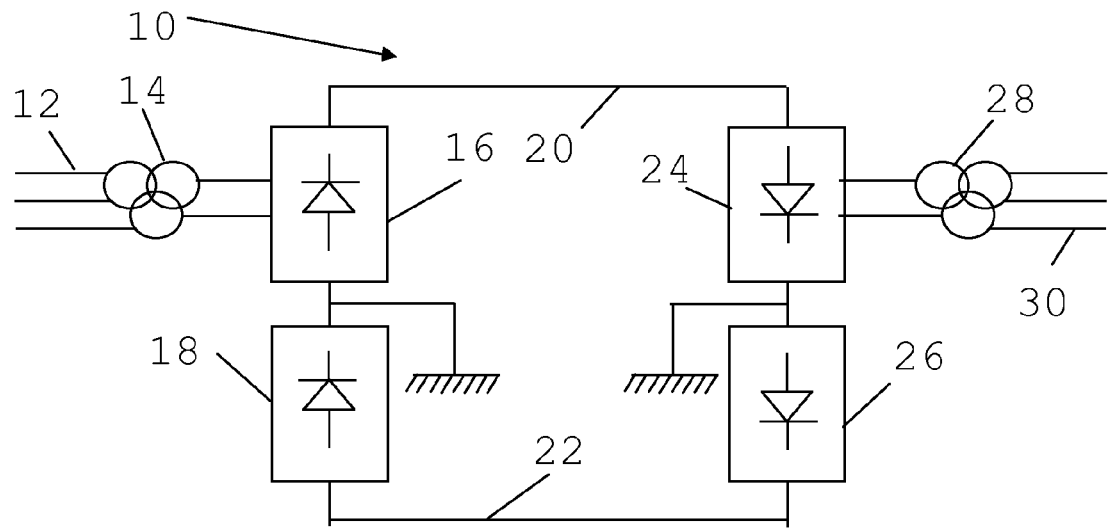

In FIG. 1 there is schematically shown a high voltage power transmission system 10 in which the principles of the present invention may be applied. The power transmission system is in the example given in FIG. 1 a HVDC (High Voltage Direct Current) power transmission system. It should be realized that the present invention is not limited to such a system, but may be used in other types of high-voltage power transmission systems, such as for instance FACTS (Flexible Alternating Current Transmission System).

In the figure there is a first AC power line 12, which is here a three-phase power line, which leads to a first transformer 14. The first transformer 14 is connected to a first converter 16, which converts the AC voltage to a DC voltage. This first converter 16 is in turn connected to a first DC power line 20, which in turn leads to a second converter 24, which is a converter converting DC power to AC power. The second converter 24 is in turn connected to a second transformer 28. The second transformer 28 is in turn connected to a second AC power line 30, which is also here a three-phase power line. The first and second converters 16 and 24 are furthermore connected to ground and is also each connected, at these ground connections, to a corresponding third and fourth converter 18 and 26, which are in turn connected to a second DC power line 22. The third converter 18 is here of the same type as the first converter 16, while the fourth converter 26 is of the same type as the second converter 24. In case of FIG. 1, the DC power lines 20 and 22 form a DC link of at least several kilometers length in order to be used to transmit power at reduced losses over a considerable distance. But it is also possible to use the same configuration of FIG. 1 to interconnect two AC power lines with for example different AC frequencies at one and the same location.

The system shown in FIG. 1 is a so-called bipole system, where the first DC power line 20 is provided at a first positive voltage and the second DC power line 22 is provided at a second opposite negative voltage. This means that there is a forward current path provided by the first DC power line 20 and a return current path provided by the second DC power line 22. However, it should be realized that it is possible to provide a monopole system instead through removing the return path provided by the second DC power line 22 and removing the third and fourth converters 18 and 26. In a monopole system the first and second converters 16 and 24 would instead only be connected between the first DC power line and ground. In this case a return path may be provided via ground.

In a system as the one that is described above there is a need to control and monitor various parts of the process of transmitting power from the first AC power line 12 to the second AC power line 30, or vice versa, such as for instance through using breakers, disconnectors, grounding switches and load tap changers in transformers. These elements are then controlled and/or monitored by a control and/or protection computer via a local control and measurement node. There is then one or more such control and/or protection computers, each normally being connected to several such control and measurement nodes.

Figure 2:
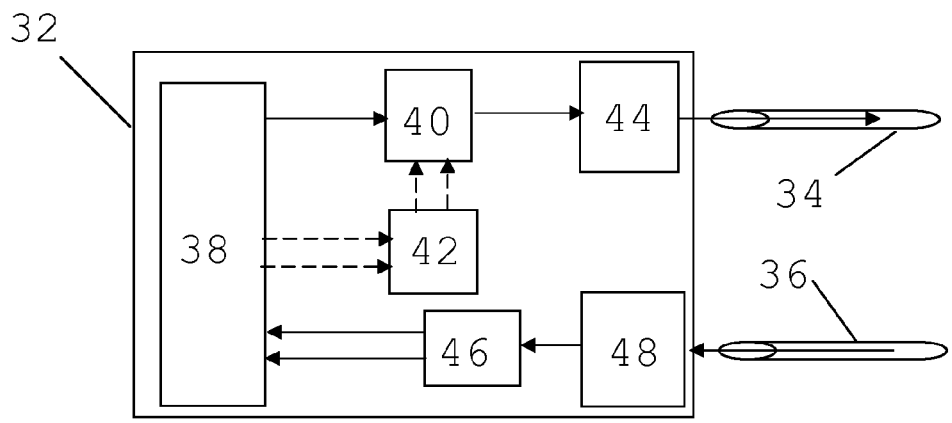
Figure 3:
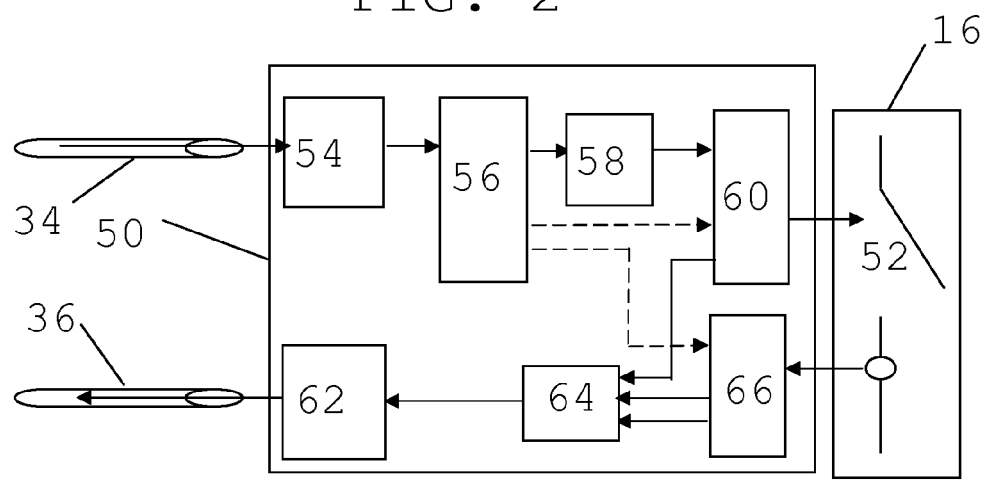
FIG. 3 shows a block schematic of a control and measurement node according to the present invention being connected to a control element, FIG. 4 schematically shows a number of method steps being taken by a control computer in a method for transmitting data related to the control of a high voltage power transmission system according to the present invention, FIG. 5 schematically shows a number of method steps being taken by a control and measurement node in a method for receiving data related to the control of a high voltage power transmission system according to the present invention, and FIG. 6 schematically shows a frame structure being used.

FIG. 2 shows a first device according to the present invention in the form of one such control computer being connected to a control and measurement node. FIG. 3 shows an exemplifying second device according to the present invention that is connected to the first device. This second device is here in the form of a control and measurement node that is being connected to a control element in the form of a breaker in a converter.

FIG. 2 does in more detail show a block schematic of a computer 32 according to the present invention. In the computer 32 there is a control unit 38 performing various ordinary control functions. The control unit 38 is connected to a first frame handling unit 40 which comprises means for providing a first frame of data. The first frame handling unit 40 is in turn connected to a synchronization data adding unit 42 comprising means for inserting synchronization data, as well as to a first transmitting unit 44 comprising means for transmitting the first frame. The control unit 38 is also directly connected to the synchronization data adding unit 42. The first transmitting unit 44 is in turn connected to a first communication connection 34 leading to a control and measurement node 50 (FIG. 3).

The first communication connection 34 is here provided in the form of a first optical fiber providing a point-to-point connection between the computer 32 and the control and measurement node 50. The control and measurement node 50 will be described later in relation to FIG. 3.

There is furthermore a second communication connection 36, which comes from the same control and measurement node 50 and which is here provided in the form of a second optical fiber providing a point-to-point connection with the control and measurement node 50. This second optical fiber 36 is connected to a first receiving unit 48 comprising means for receiving a second frame of data. The first receiving unit 48 is furthermore connected to a first processing unit 46 comprising means for processing a second frame of data, which first processing unit 46 is in turn connected to the control unit 38.

The various units, except for the transmitting and receiving units of the computer may be provided through processors and memories in the computer, which may be internally interconnected via a bus. The first transmitting unit 44 is here provided in the form of an electro-optical converter, which may be an IR diode or a laser emitting light onto which data is modulated in known fashion. In a similar manner the first receiving unit 48 may be provided in the form of a conventional opto-electrical converter, which converts light having data modulated onto it into electrical pulses.

The above-described units are thus provided for communication with one control and measurement node. It is however possible that communication can be made with more such nodes, in which case further transmitting and receiving units may be provided for the further connections. The rest of the units can be arranged to serve also the communication with further nodes.

FIG. 3 does in more detail show a block schematic of a control and measurement node 50 being connected to a control element, here a breaker 52 provided in the first converter 16, as well as to a line in which the breaker 52 is connected. A control element is a binary type of I/O device, i.e. an I/O device operating on binary signals.

The first optical fiber 34 is here connected to a second receiving unit 54 comprising means for receiving a first frame of data, which second receiving unit 54 is connected to an extracting unit 56 comprising means for extracting synchronization data. The extracting unit 56 is in turn connected to a second frame processing unit 58 comprising means for processing the first frame. The second frame processing unit 58 is connected to a local control unit 60, which controls the control element, here the breaker 52. There is also a sampling unit 66 connected, perhaps via one or two measurement transformers, to the line in which the breaker 52 is connected. The extracting unit 56 is connected also to the local control unit 60 as well as the sampling unit 66. The sampling unit 66 is connected to a second frame handling unit 64 comprising means for providing a second frame. The second frame handling unit 64 is in turn connected to a second transmitting unit 62 comprising means for transmitting the second frame. The second transmitting unit 62 is in turn connected to the second optical fiber 36.

The second receiving and transmitting units 54 and 62 are here provided in the same way as the first receiving and transmitting units 48 and 44 of the computer 32. The rest of the units may with advantage be provided as one or more processors with corresponding memories including program code for performing their functionalities.

Figure 4:
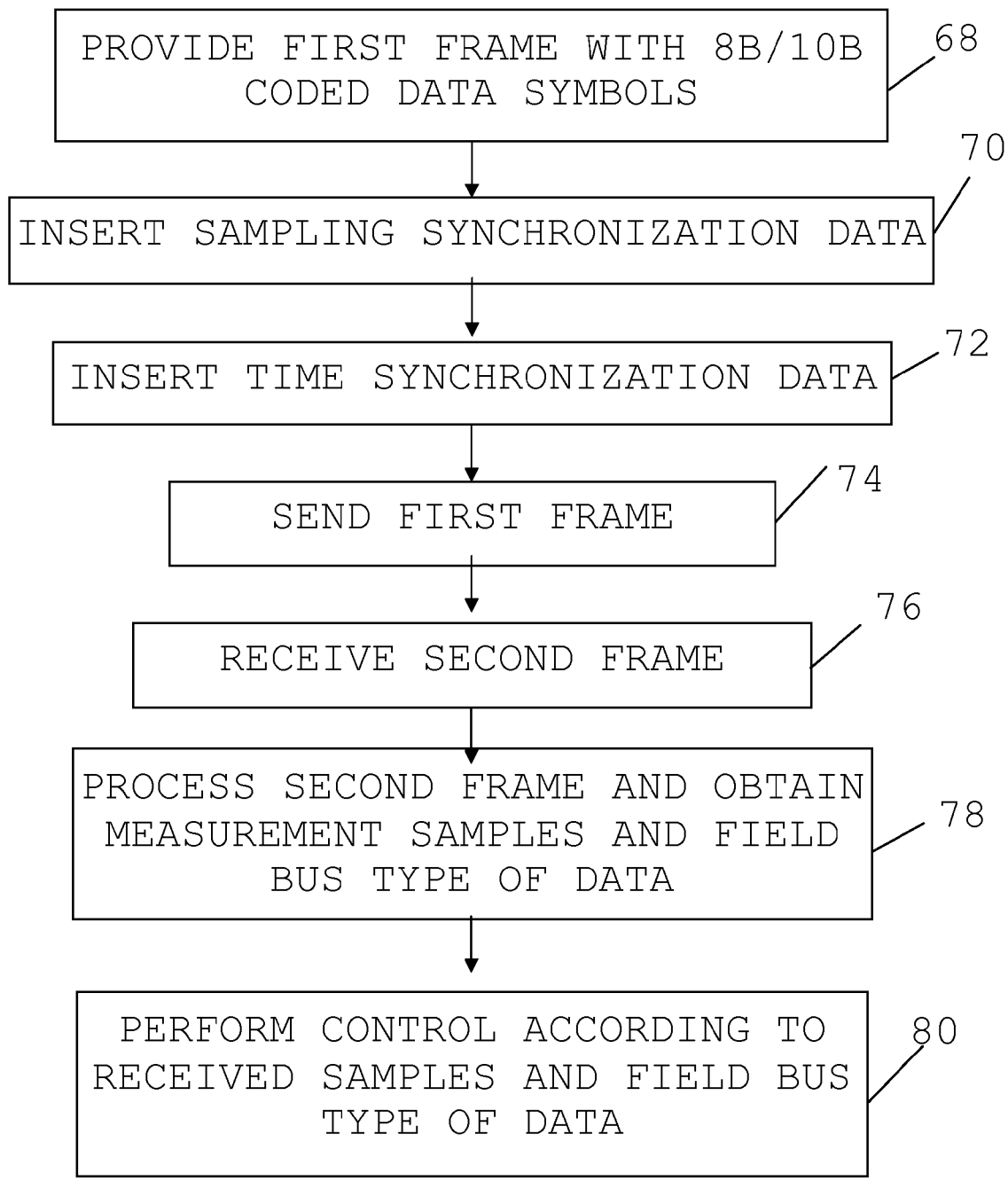
Figure 6:
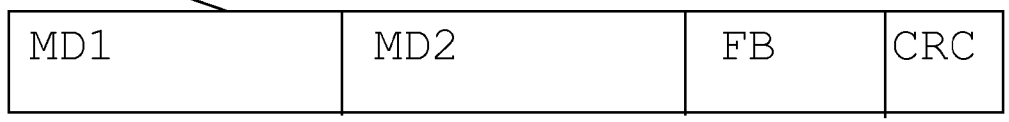
Figure 5:
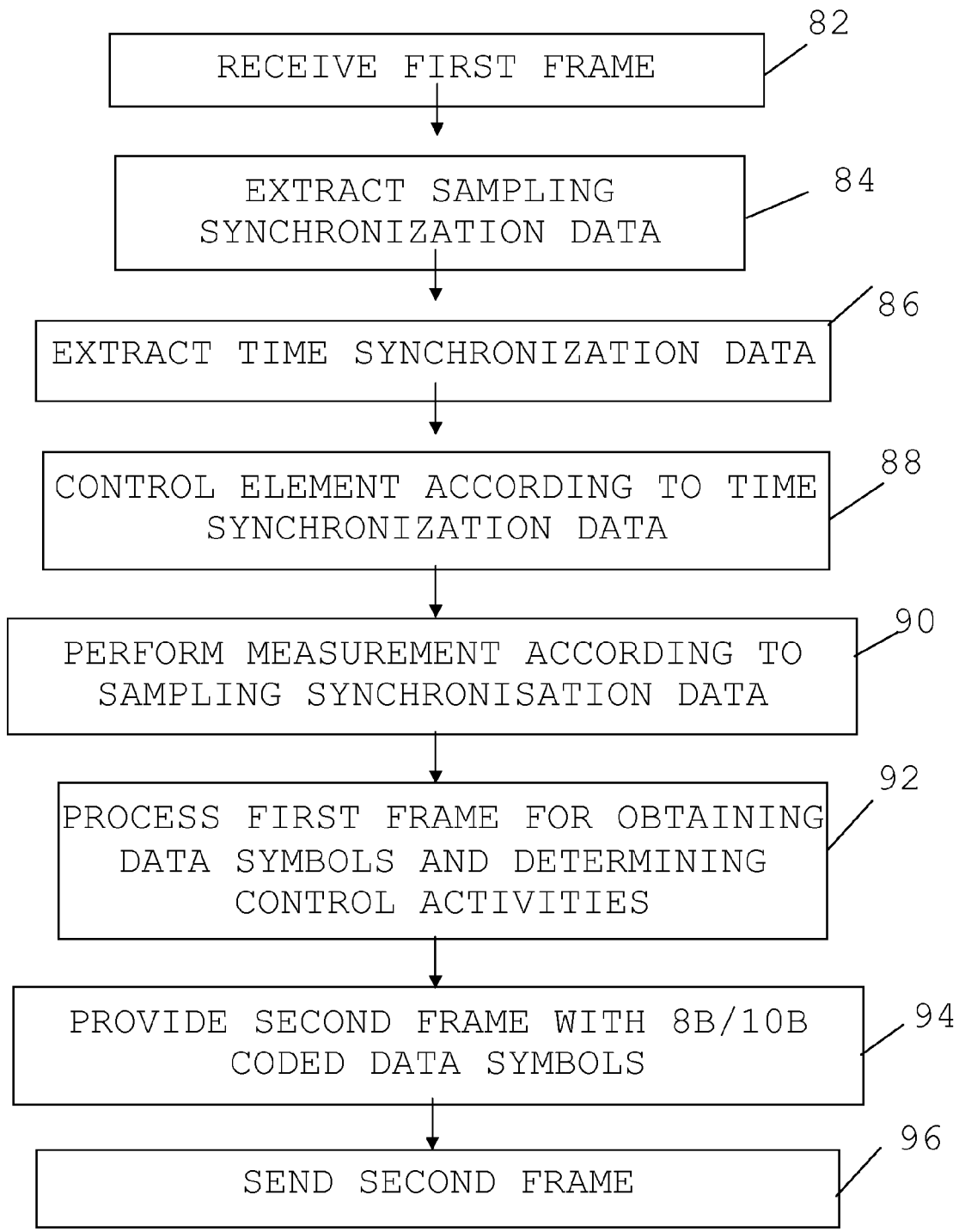

The functioning of the computer 32 and the associated control and measurement node 50 will now be described with reference being made to FIGS. 2 and 3 as well as with reference being made to FIG. 4, which shows a number of method steps being taken by a computer in a method for transmitting data according to the present invention, to FIG. 5, which shows a number of method steps being taken by a control and measurement node in a method for receiving data according to the present invention and to FIG. 6, which schematically shows a frame structure being used for transmitting data between the computer 32 and the control and measurement node 50.

The computer 32 needs to communicate with the control and measurement node 50 in order to perform control and supervision of the system. For this reason there are a number of types of signals that need to be transmitted between the computer and the control and measurement node.

The control unit 38 of the computer 32 does for instance need to transmit field bus type of data, like for instance control commands and indications, to the control and measurement node 50. Field bus type of data is data normally sent on a separate field bus, like for instance a CAN bus or a ProfiBus or PPS (Pulse per second) signals. Such data is here sent by the control unit 38 to the first frame handling unit 40. The first frame handling unit 40 here provides a first frame of data, which frame is provided according to a format that is schematically outlined in FIG. 6.

In a frame F there are here sections for various types of data, where there may be a first section MD1 for measurement data of a first type, like current measurement data, a second section MD2 for measurement data of a second type, like voltage measurement data, as well as a section FB for field bus type of data. There is finally a section CRC for fault detection and/or correction code data.

The first frame handling unit 40 furthermore performs 8B/10B coding of all the data going into the frame, according to which coding principle octets (8-bits) are coded using 10-bits. In this way 256 different symbols out of 1024 possible symbols are used for coding data, where these symbols that are used for coding data are here termed data symbols. According to this principle there are furthermore a number of additional symbols, control symbols, here 16 symbols, of which some are used for indicating start and stop of a frame, and beginning and end of sections of a frame. However some of these control symbols remain after being used in this way. These control symbols are distinctly separated from the data symbols and can therefore be inserted anywhere in a frame. The first frame handling unit 40 therefore provides a first frame including 8B/10B coded data symbols, step 68. The type of data symbols included may be dynamically selected based on need and here normally includes field bus type of data, such as for instance a command for controlling the breaker 52.

The control unit 38 furthermore sends synchronization data that is related to the operation of the control and measurement node 50 to the synchronization data adding unit 42. The synchronization data thus concerns synchronization of control activities that are performed by the control and measurement node 50. These may be sent at various points in time and need not be included in all frames that are to be sent to the control and measurement node 50. Synchronization data may here include sampling synchronization data and time synchronization data. Both types need furthermore not be provided simultaneously. In order to exemplify the present invention, the control unit 38 here sends both sampling synchronization data, i.e. data indicating at what points in time measurement samples are to be taken by the control and measurement node 50, as well as time synchronizations data, for instance data synchronizing the control and measurement node 50 with other control and measurement nodes of the system. Such time synchronization data may thus indicate when for instance a breaker is to be opened and is sent in order to synchronize the operation of the control element controlled by the control and measurement node 50 with the operation of other elements controlled by other control and measurement nodes. In order to separate the ordinary data from the synchronization data, the sending of synchronization data is in FIG. 2 indicated with dashed arrows, while the sending of "ordinary" data is indicated with a solid arrow. The synchronization data adding unit 42 then inserts the sampling synchronization data into the first frame, step 70, and inserts the time synchronization data into the first frame, step 72. Synchronization data is here provided as control symbols and is thus inserted through inserting a number of such control symbols into the first frame. Through the use of such control symbols the synchronization data is distinctly separated from the ordinary data symbols. The synchronization data may therefore also be inserted anywhere in the first frame. After this has been done, the first frame handling unit 40 may add a fault detection and/or correction code (CRC) to all the data in the first frame, for instance through using a cyclic redundancy code.

The first frame with the added synchronization data is then sent to the first transmitting unit 44 where it is converted from the electrical to the optical domain and then sent via the first optical fiber 34 to the control and measurement node 50. Since it is sent as an optical signal, the transmission rate is very high, for instance 40-160 Mbps.

The first frame is then received by the second receiving unit 54 of the control and measurement node 50, step 82, where it is converted from the optical to the electrical domain and then forwarded to the extracting unit 56. The extracting unit 56 extracts the control symbols used for synchronization data that is coded into the first frame. It thus extracts the sampling synchronization data, step 84, and the time synchronization data, step 86. The time synchronization data is then directly forwarded to the local control unit 60, while the sampling synchronization data is forwarded to the sampling unit 66. This sending of synchronization data is also here indicated with dashed arrows.

As soon as the respective units receive the synchronization data they act on it, i.e. they perform actions related to it. This means that the local control unit 60 may control the breaker 52 according to a control command received in a previous frame as soon as it receives time synchronization data, i.e. it controls the control element (breaker 52) according to the time synchronization data, step 88. It may thus open the breaker 52 based on the reception of the time synchronization data. At the same time the sampling unit 66 may take a measurement sample as soon as sample synchronization data is received. It thus performs a measurement according to the sampling synchronization data, step 90. This may be done through measuring analog values like analog current and voltage values via corresponding measurement transformers and sampling them to digital values. The extracting unit 56 furthermore forwards the rest of the first frame to the second frame handling unit 58, which goes on and processes the first frame for obtaining the data in it and determining what control activities are to be performed based on the data symbols thus received, step 92. This is furthermore done after the synchronization data had been extracted. The data may here have included a control command in a field bus type section FB. The second frame handling unit 58 here extracts the data symbols from the respective sections based on the associated control symbols and forwards the data of the various types to the units of the control and measurement node that are to receive them. Here the field bus type of data is sent to the local control unit 60. The local control unit 60 then decides to perform some action in relation to the received data, for instance to control the breaker 52. This control, which may be the closing of the breaker 52, may then be performed later when new synchronization data is received.

The sampling unit 66, which received the sampling synchronization data does, as was mentioned above, obtain measurement samples at a time determined by the sampling synchronization data, which is preferably as soon as it is received. It may however also obtain measurement samples at other times, like regularly according to some sampling scheme. The samples that the sampling unit 66 obtains, for instance current and voltage measurement samples, it then provides to the second frame handling unit 64. The second frame handling unit 64 furthermore receives also field bus type of data such as indicators and alarms, from the sampling unit 66 and/or the local control unit 60. The second frame handling unit 64 then goes on and creates a second frame in the same way as the first frame handling unit 40 created a first frame. It thus provides a second frame with 8B/10B coded data symbols, step 94, which data symbols may thus include measurement samples and field bus type of data, where these various type of data are provided in different sections MD1, MD2 and FB, the positions of which in the frame are indicated by control symbols. It may here also add fault detection and/or correction code (CRC). As is clear, the second frame has the same type of structure as the first frame. The second frame is then sent to the second transmitting unit 62, where it is converted from the electrical to the optical domain and then sent to the computer 32 via the second optical fiber 36, step 96.

The second frame is received by the first receiving unit 48 of the computer 32, step 76, where it is converted from the optical to the electrical domain and then sent to the first frame handling unit 46, which goes on and processes the second frame for obtaining the data in it, step 78. It here extracts the data symbols from the respective sections based on the associated control symbols, which data here include measurement samples and field bus type of data, and forwards the data of the various types to the parts of the control unit 38 that are to receive them. The control unit 38 then performs control based on analyzing the received samples and the received field bus type of data, step 80.

In this way communication then proceeds with communication back and forth between computer 32 and control and measurement node 50. Frames are thus continuously sent back and forth between the computer 32 and the control and measurement node 50.

The present invention thus provides a single very fast point-to-point connection between a computer and a control and measurement node in the control system of a high voltage power transmission system. According to the present invention data of various types are sent in this connection including measurement samples, field bus type of data as well as synchronization data. There is therefore a reduction of the number of connections being provided. Through this fast connection a great number of measurement samples may be sent corresponding to a total rate of 40-150 Mbit/s. The invention also provides a very fast, reliable and flexible synchronization of a control and measurement node, both regarding taking of measurement samples and regarding synchronization of control activities with other control and measurement nodes. The use of 8B/10B coding has the further advantage of limiting the use of symbols having many zero- or one-bits. This is advantageous in that the use of DC-offsets can be avoided, which cannot be used over an optical fiber link.

The communication connection used is characterized by large data carrying capacity, very low latency and "no jitter" operation. This is advantageous when used to feed the control computer with high bandwidth measured signals. Each connection is able to transmit over 300 000 samples per second (one sample every 3 µS).

It should be realized that the present invention may be varied in a number of ways. It is for instance possible that only one optical fiber is used for communication in both directions. Then of course different sources of light with different wavelengths are used for the two directions. It is possible to combine the receiving and transmitting unit in a control and measurement node and/or computer into one unit, a transceiving unit. In the same way it is possible to provide a combined frame handling and frame processing unit. The synchronization data adding unit may furthermore be a part of a frame handling unit. It should furthermore be realized that all types of data need not be sent at the same time, but may only be sent at the instant in time when it is actually needed. It is furthermore possible that the synchronization data sent is only sampling synchronization data or time synchronization data. It is thus possible with any type of data being combined when communicating in one direction. The description made above was made in relation to a control computer. It may in the same manner be applied to a protection computer. It is furthermore possible to combine a control and a protection computer into one computer.

From the foregoing discussion it is evident that the present invention can be varied in a multitude of ways. It shall consequently be realized that the present invention is only to be limited by the following claims.

The invention claimed is:

1. A method of transmitting data related to control of transmission of power in a high voltage power transmission system from a first AC (Alternating Current) power line to a second AC power line or vice versa, the method comprising: providing a first frame of data including data symbols according to a frame structure, said frame structure including sections for data symbols containing measurement samples and sections for data symbols containing field bus type of data, inserting synchronization data into said first frame in the form of control symbols, distinctively separated from the data symbols, sending said first frame from a first device to a second device in a point-to-point connection, wherein the first device comprises a computer for at least one of control or protection and the second device comprises a control and measurement node, and synchronizing control activities in the transmission of power in the high voltage power transmission system from a first AC power line to a second AC power line or vice versa, wherein the synchronizing is performed by the second device utilizing said synchronization data, wherein the data symbols are provided through 8B/10B coding of measurement samples and field bus type data, and wherein the control symbols are control symbols of the 8B/10B coding.

2. The method according to claim 1, further comprising: receiving in a point-to-point connection, with said first device from said second device, a second frame of data including data symbols according to the same frame structure as the first frame has.

3. The method according to claim 1, wherein said synchronization data includes sampling synchronization data indicating when the second device is to take measurement samples in the system.

4. The method according to claim 1, wherein said synchronization data includes time synchronization data for synchronizing the second device with other devices of the same type.

5. The method according to claim 1, wherein frames are provided with fault detection and/or correction code.

6. The method according to claim 1, wherein the first device is a computer for control and/or protection and the second device is a control and measurement node.

7. A first device arranged to transmit data related to control of transmission of power in a high voltage power transmission system to a second device comprising a control and measurement node via a point-to-point connection, the first device comprising: a computer for control and/or protection, the computer comprising a first frame handling unit configured to provide a first frame of data including data symbols according to a frame structure, said frame structure including sections for data symbols containing measurement samples and sections for data symbols containing field bus type of data, a synchronization data adding unit configured to insert synchronization data into said first frame in the form of control symbols distinctively separated from the data symbols, and a transmitting unit configured to send said first frame, wherein said synchronization data provides synchronization of control activities in of transmitting the transmission of power in the high voltage power transmission system from a first AC (Alternating Current) power line to a second AC power line or vice versa, wherein the synchronizing is to be performed system by the second device comprising the control and measurement node, wherein the data symbols are provided through 8B/10B coding of measurement samples and field bus type data, and wherein the control symbols are control symbols of the 8B/10B coding.

8. The first device according to claim 7, further comprising:
a receiving unit configured to receive, via a point-to-point connection from said second device, a second frame of data including data symbols according to the same frame structure as the first frame has.

9. The first device according to claim 7, wherein said synchronization data includes sampling synchronization data indicating when the second device is to take measurement samples in the system.

10. The first device according to claim 7, wherein said synchronization data includes time synchronization data for synchronizing the second device with other devices of the same type.

11. The first device according to claim 7, further comprising:
a computer for control and/or protection and the second device is a control and measurement node.

12. A method of receiving data related to control of transmission of power in a high voltage power transmission system from a first AC (Alternating Current) power line to a second AC power line or vice versa, the method comprising: receiving, in a point-to-point connection by a second device from a first device, a first frame of data including data symbols according to a frame structure, said frame structure including sections for data symbols containing measurement samples and sections for data symbols containing field bus type of data and into which first frame synchronization data, in the form of control symbols distinctively separated from the data symbols, has been inserted, wherein the first device comprises a computer for at least one of control or protection and the second device comprises a control and measurement node, extracting said synchronization data from said first frame, processing, after said extracting, said first frame for obtaining said data symbols, and synchronizing control activities in power the transmission of power in the high voltage power transmission system, said control activities being performed by the second device, wherein the data symbols are provided through 8B/10B coding of measurement samples and field bus type data, and wherein the control symbols are control symbols of the 8B/10B coding.

13. The method according to claim 12, further comprising:
   providing a second frame of data including data symbols according to the same frame structure as the first frame has, and
   sending said second frame from the second device to the first device in a point-to-point connection.

14. The method according to claim 12, wherein said synchronization data includes sampling synchronization data indicating when the second device is to take measurement samples in the system.

15. The method according to claim 12, wherein said synchronization data includes time synchronization data for synchronizing the second device with other devices of the same type.

16. The method according to claim 12, wherein the first device is a computer for control and/or protection and the second device is a control and measurement node.

17. A second device arranged to receive data related to control of transmission of power in a high voltage power transmission system from a first AC (Alternating Current) power line to a second AC power line or vice versa, wherein the data is sent from a first device comprising a computer for at least one of control or protection via a point-to-point connection, the second device comprising: a control and measurement node; a receiving unit configured to receive a first frame of data including data symbols according to a frame structure, said frame structure including sections for data symbols containing measurement samples and sections for data symbols containing field bus type of data and into which first frame synchronization data, in the form of control symbols distinctively separated from the data symbols, has been inserted, an extracting unit configured to extract said synchronization data from said first frame, and a processing unit configured to process means for processing, after said extracting, said first frame for obtaining said data symbols, wherein said synchronization data provides synchronization of control activities in the transmission of power in the high voltage power transmission system from the first AC power line to the second AC power line or vice versa, wherein the synchronizing is performed by the second device, wherein the data symbols are provided through 8B/10B coding of measurement samples and field bus type data, and wherein the control symbols are control symbols of the 8B/10B coding.

18. The second device according to claim 17, further comprising:
   a second frame handling unit configured to provide a second frame of data including data symbols according to the same frame structure as the first frame has, and
   a transmitting unit configured to send, via a point-to-point connection, said second frame to the first device.

19. The second device according to claim 17, wherein said synchronization data includes sampling synchronization data indicating when the second device is to take measurement samples in the system.

20. The second device according to claim 17, wherein said synchronization data includes time synchronization data for synchronizing the second device with other devices of the same type.

21. The second device according to claim 17, wherein the second device is a control and measurement node and the first device is a computer for control and/or protection.

* * * * *

UNITED STATES PATENT AND TRADEMARK OFFICE
CERTIFICATE OF CORRECTION

PATENT NO. : 8,532,144 B2  
APPLICATION NO. : 12/600319  
DATED : September 10, 2013  
INVENTOR(S) : Björklund et al.

Page 1 of 1

It is certified that error appears in the above-identified patent and that said Letters Patent is hereby corrected as shown below:

On the Title Page item (75) Inventors should read as:

Hans Björklund, ~~Ludvika~~ <u>Västerås</u>, (SE)  
Krister Nyberg, Smedjebacken, (SE)

Signed and Sealed this  
Thirteenth Day of May, 2014

Michelle K. Lee  
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,532,144 B2 | Page 1 of 1 |
| APPLICATION NO. | : 12/600319 | |
| DATED | : September 10, 2013 | |
| INVENTOR(S) | : Bjorklund et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 682 days.

Signed and Sealed this
Seventeenth Day of February, 2015

Michelle K. Lee
*Deputy Director of the United States Patent and Trademark Office*